United States Patent
Bag et al.

(10) Patent No.: US 11,892,823 B2
(45) Date of Patent: Feb. 6, 2024

(54) LIMITING CELLULAR NETWORK INFLUENCE ON LATENCY IN AN INDUSTRIAL AUTOMATION SYSTEM

(71) Applicant: ABB Schweiz AG, Baden (CH)

(72) Inventors: Gargi Bag, Västerås (SE); Krister Landernäs, Hallstahammar (SE); Petri Hovila, Vaasa (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/248,559

(22) PCT Filed: Oct. 13, 2021

(86) PCT No.: PCT/EP2021/078247
§ 371 (c)(1),
(2) Date: Apr. 11, 2023

(87) PCT Pub. No.: WO2022/079071
PCT Pub. Date: Apr. 21, 2022

(65) Prior Publication Data
US 2023/0273604 A1 Aug. 31, 2023

(30) Foreign Application Priority Data
Oct. 13, 2020 (EP) .................................. 20201641

(51) Int. Cl.
*G05B 19/418* (2006.01)
*H04L 12/28* (2006.01)
(Continued)

(52) U.S. Cl.
CPC ...... *G05B 19/4185* (2013.01); *H04L 12/2803* (2013.01); *H04W 76/14* (2018.02); *H04W 40/00* (2013.01)

(58) Field of Classification Search
CPC .......... G05B 19/4185; H04L 12/2803; H04W 76/14; H04W 40/00
See application file for complete search history.

(56) References Cited

U.S. PATENT DOCUMENTS

| | | | |
|---|---|---|---|
| 2006/0009235 A1* | 1/2006 | Sheynblat | G01S 5/0036 455/456.1 |
| 2014/0045502 A1* | 2/2014 | Whinnett | H04W 36/06 455/437 |

(Continued)

FOREIGN PATENT DOCUMENTS

| | | |
|---|---|---|
| EP | 3540991 B1 | 7/2021 |
| IN | 201621011488 | 6/2017 |
| WO | 2011109027 A1 | 9/2011 |

OTHER PUBLICATIONS

European Search Report; Application No. 20201641.6; Completed: Feb. 19, 2021; dated Mar. 1, 2021; 9 Pages.

(Continued)

*Primary Examiner* — Kidest Bahta
(74) *Attorney, Agent, or Firm* — Whitmyer IP Group LLC

(57) ABSTRACT

In an industrial automation system including a first and a second wireless communication device communicating with each other via a cellular network, the first wireless communication device obtains, while the first wireless communication device is attached to a first base station of the cellular network, knowledge about to which base station the second wireless communication device is attached and if the second wireless communication device is attached to a second allowable base station, the first wireless communication device detaches from the first base station and attaches to the second base station.

18 Claims, 4 Drawing Sheets

(51) Int. Cl.
*H04W 40/00* (2009.01)
*H04W 76/14* (2018.01)

(56) References Cited

U.S. PATENT DOCUMENTS

| | | | |
|---|---|---|---|
| 2014/0355444 A1 | 12/2014 | Turtinen et al. | |
| 2015/0282028 A1 | 10/2015 | Vrind et al. | |
| 2015/0289310 A1* | 10/2015 | Bhatia | H04W 76/15 370/329 |
| 2016/0353360 A1* | 12/2016 | Lee | H04W 72/542 |

OTHER PUBLICATIONS

PCT International Search Report and Written Opinion of the International Searching Authority; Application No. PCT/EP2021/078247; Completed: Jan. 12, 2022; dated Jan. 24, 2022; 13 Pages.
General Dynamics Broadband UK; "Prose Communication out of network coverage"; 3gpp Draft; S2-131844 Prose, 3rd Generation Partnership Project (3gpp), Mobile Competence Centre ; 650, Route Des Lucioles ; F-06921 Sophia-Antipolis Cedex ; France; vol. Sa WG2, No. Busan, Korea; May 27, 2013-May 31, 2013; May 21, 2013; XP050709021, Retrieved from the Internet; URL:http://www.3gpp.org/ftp/tsg sa/WG2 Arc h/TSGS2 97 Busan/Docs/; 12 Pages.

* cited by examiner

LIMITING CELLULAR NETWORK INFLUENCE ON LATENCY IN AN INDUSTRIAL AUTOMATION SYSTEM

TECHNICAL FIELD

The invention generally relates to industrial automation systems. More particularly, the invention relates to a method, computer program and computer program product for setting up communication between a first and a second wireless communication device of an industrial automation system via a cellular network as well as to a first wireless communication device in such an industrial automation system.

BACKGROUND

With the evolution of 4G and 5G cellular networks, it has become of interest to use these cellular networks for communication in industrial automation systems.

One example of this is given in EP 3540991, where a cellular network is used for the communication between Intelligent Electronic Devices (IEDs) in an electrical power system.

One example of a parameter that may need to be considered in an industrial automation system is the latency. In many applications this has to be very low and/or bounded. Other examples of important parameters are jitter and reliability.

When a cellular network is used for the communication between the wireless communication devices of the industrial automation system, the network has an impact on the above-mentioned parameters. It is therefore often of interest to limit this influence of the cellular network as much as possible.

WO 2011/109027 describes cellular controlled device-to-device (D2D) communications. In the document a first and second wireless communication device are initially communicating with each other via a first base station in a D2D session. As the second wireless communication device is being handed over to a second base station, it informs the first wireless communication device about this second base station, whereupon the first wireless communication device is handed over to the second base station through a handover if the quality is adequate.

US 2015/0282028 likewise discusses cellular controlled D2D communication where at least one of two wireless communication devices may be handed over to a second new cell and the other may follow or remain connected to a first cell.

US 2014/0355444 describes how a first wireless communication device receives a discovery signal from a second wireless communication device, which discovery signal comprises a cell ID of the second wireless communication device. The first wireless communication device then investigates if this cell ID can be found on a list, and if so, the first wireless communication device triggers the setting up of a local routing path.

SUMMARY

One object of the present invention is therefore to limit negative influence of a cellular network on one or more parameters of the communication between wireless communication devices of an industrial automation system, while allowing the wireless communication devices to adapt to the case that such negative influences cannot be limited. The negative influence may be the negative influence on the latency, jitter and/or reliability.

This object is according to a first aspect achieved by a method of setting up communication between a first and a second wireless communication device of an industrial automation system via a cellular network, the method being performed in the first wireless communication device and comprising:

receiving, while the first wireless communication device is attached to a first base station of the cellular network, a first message from the second wireless communication device via the first base station, the first message comprising base station identifying information identifying a base station of the cellular network to which the second wireless communication device is attached, investigating the base station identifying information of the first message in order to identify the base station to which the second wireless communication device is attached, if the second wireless communication device is attached to a second base station, further performing investigate if one or more conditions for attaching to the second base station are fulfilled by the first wireless communication device, where one condition is that the second base station is allowable, and send a response to the first message concerning the ability of the first wireless communication device to attach to the second base station, wherein if the one or more conditions are fulfilled the method further comprises detaching from the first base station, and attaching to the second base station.

This object is according to a second aspect achieved by a first wireless communication device in an industrial automation system configured to communicate via a cellular network and comprising a radio circuit for wireless communication with other wireless communication devices of the industrial automation system via the cellular network, and a communication handling block configured to receive, while the first wireless communication device is attached to a first base station of the cellular network, a first message from the second wireless communication device via the first base station, the first message comprising base station identifying information identifying a base station of the cellular network to which the second wireless communication device is attached, investigate the base station identifying information of the first message in order to identify the base station to which the second wireless communication device is attached, if the second wireless communication device is attached to a second base station, being further configured to investigate if one or more conditions for attaching to the second base station are fulfilled by the first wireless communication device, where one condition is that the second base station is allowable, and instruct the radio circuit to send a response to the first message concerning the ability of the first wireless communication device to attach to the second base station, wherein if the one or more conditions are fulfilled, the communication handling block is further configured to instruct the radio circuit to detach from the first base station and instruct the radio circuit to attach to the second base station.

The object is according to a third aspect achieved through a computer program for setting up communication between a first and a second wireless communication device of an industrial automation system via a cellular network, the computer program comprising computer program code, which when run by a processor of a communication handling block of the first wireless communication device, causes the communication handling block to:

receive, while the first wireless communication device is attached to a first base station of the cellular network, a first message from the second wireless communication device via the first base station, the first message comprising base station identifying information identifying a base station of the cellular network to which the second wireless communication device is attached, investigate the base station identifying information of the first message in order to identify the base station to which the second wireless communication device is attached, if the second wireless communication device is attached to a second base station, further cause the communication handling block to investigate if one or more conditions for attaching to the second base station are fulfilled by the first wireless communication device, where one condition is that the second base station is allowable, and instruct the radio circuit to send a response to the first message concerning the ability of the first wireless communication device to attach to the second base station, wherein if the one or more conditions are fulfilled, the communication handling block is further caused to instruct the radio circuit to detach, from the first base station and instruct the radio circuit to attach to the second base station.

The object is according to a fourth aspect achieved through a computer program product for setting up communication between a first and a second wireless communication device of an industrial automation system via a cellular network, the computer program product comprising a data carrier with the computer program code according to the third aspect.

An allowable base station may be a base station with which the first wireless communication device is allowed to communicate either by the cellular network and/or by the industrial automation system.

The industrial automation system may be an electrical power system and the first wireless communication device may be an intelligent electronic device. In one variation this intelligent electronic device is a phasor measurement unit. In another variation it is a phasor data concentrator. Also, the second wireless communication device may be an intelligent electronic device, for instance a phasor measurement unit or a phasor data concentrator. When the second wireless communication device is a phasor data concentrator, the first wireless communication device may be a phasor measurement unit. When the second wireless communication device is a phasor measurement unit, the first wireless communication device may be either a phasor measurement unit or a phasor data concentrator.

The first message may be a message that is sent between the first and second wireless communication devices over a link that is set up between the first and second wireless communication device through the cellular network.

The base station identifying information may comprise data broadcast by a base station, for instance in a pilot signal, which data identifies the base station. The base station identifying information may comprise information such as Cell ID, Network ID and Tracking Area ID.

As was mentioned above, the attaching and detaching may only be performed if one or more conditions for attaching to the second base station are fulfilled by the first wireless communication device.

One condition may be that the first wireless communication device is not involved in communication sessions with any other wireless communication devices.

According to a first variation of the first aspect, the method therefore further comprises investigating if there is an ongoing communication session with another wireless communication device of the industrial automation system via the first base station and only performing the detaching and attaching in case there is not.

According to a corresponding variation of the second aspect, the communication handling block is further configured to investigate if there is an ongoing communication session with another wireless communication device of the industrial automation system via the first base station and to only instruct the detaching and attaching in case there is not.

As was mentioned earlier, one condition may be that the second base station is allowable for the first wireless communication device, i.e. that the first wireless communication device is allowed to communicate with the second base station.

According to a second variation of the first aspect, the method therefore further comprises investigating the allowability of the second base station and only performing the detaching and attaching in case the second base station is allowable.

According to a corresponding variation of the second aspect, the communication handling block is further configured to investigate the allowability of the second base station and to only instruct the detaching and attaching in case the second base station is allowable.

The investigating of the allowability may comprise investigating if the second base station is on a list of approved base stations associated with the first wireless communication device. This allowability investigation may additionally involve an investigation of cellular network. The allowability investigation may also comprise an investigation of the availability of the second wireless communication, such as if the first wireless communication device is able to communicate with it.

Yet another condition may be that the link quality between the first wireless communication device and the second base station fulfils a link quality criterion.

According to a third variation of the first aspect, the method therefore further comprises investigating the quality of the wireless link between the first wireless communication device and the second base station and only performing the detaching and attaching in case the link quality fulfils the link quality criterion.

According to a corresponding variation of the second aspect, the communication handling block is further configured to investigate the quality of a wireless link between the first wireless communication device and the second base station and to only instruct the detaching and attaching in case the link quality fulfils the link quality criterion.

The response may be a positive response to the first message being sent if the one or more conditions are fulfilled.

A positive response to the first message is a response indicating an ability of the first wireless communication device to attach to the second base station.

The response may as an alternative be a negative response to the first message being sent if the one or more conditions are not fulfilled.

A negative response to the first message is a response indicating an inability of the first wireless communication device to attach to the second base station.

When the response is a negative response, the method may according to a fourth variation of the first aspect, further comprise sending a positive response to the first message if the one or more conditions are fulfilled.

According to a corresponding variation of the second aspect, the communication handling block may in the same situation be further configured to instruct the radio circuit to send a positive response to the first message if the one or more conditions are fulfilled.

According to a fifth variation of the first aspect, the method further comprises sending a second message to the second wireless communication device comprising base station identifying information that identifies the first base station and receiving a response to the second message from the second wireless communication device concerning the ability of the second wireless communication device to attach to the first base station.

According to a corresponding variation of the second aspect, the communication handling block is further configured to order the radio circuit to send a second message to the second wireless communication device comprising base station identifying information that identifies the first base station and to receive a response to the second message from the second wireless communication device concerning the ability of the second wireless communication device to attach to the first base station.

Also, the second message may be a message that is sent between the first and second wireless communication devices over a link that is set up between the first and second wireless communication device through the cellular network.

The response may be a negative response in case the second wireless communication device finds that one or more conditions for the second wireless communication device to attach to the first base station are not fulfilled, where the negative response indicates an inability of the second wireless communication device to attach to the first base station.

Instead or in addition, a positive response may be received from the second wireless communication device in case the second wireless communication device finds that one or more conditions for the second wireless communication device to attach to the first base station are fulfilled, where the positive response indicates an ability of the second wireless communication device to attach to the first base station.

When the response is a negative response, the method may according to a sixth variation of the first aspect further comprise receiving a positive response to the second message from the second wireless communication device in case the second wireless communication device finds that the one or more conditions for the second wireless communication device to attach to the first base station are fulfilled.

According to a corresponding variation of the second aspect, the communication handling block is further configured to receive a positive response to the second message from the second wireless communication device in case the second wireless communication device finds that the one or more conditions for the second wireless communication device to attach to the first base station are fulfilled.

According to a seventh variation of the first aspect, the method further comprises starting sending data to and/or receiving data from the second wireless communication device via the radio circuit and the second base station after the attaching to the second base station.

According to a corresponding variation of the second aspect, the communication handling block is further configured to start to send data to and/or receive data from the second wireless communication device via the radio circuit and the second base station after the attaching to the second base station.

The invention has many advantages. It does for instance ensure that the contribution to the latency by the cellular network is kept to a minimum. If the wireless communication devices are involved in control in the automation system then the used control loops may be simplified, which may result in less jitter. Also, the reliability may increase, since fewer devices and components are involved. An application can be connected to a single base station, which may also simplify commissioning/provisioning. The moving of the first wireless communication device to the second base station may also be performed prematurely if the first base station is going down. Through the reception of the first message and the sending of a negative response it is possible for the two wireless communication devices to adapt their communication to the knowledge that they are connected to the same base station or different base stations. It is for instance possible for control loops to adapt to variations in delay and/or jitter.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention is generally directed towards the use of cellular networks for communication between devices in industrial automation systems.

Figure 1:
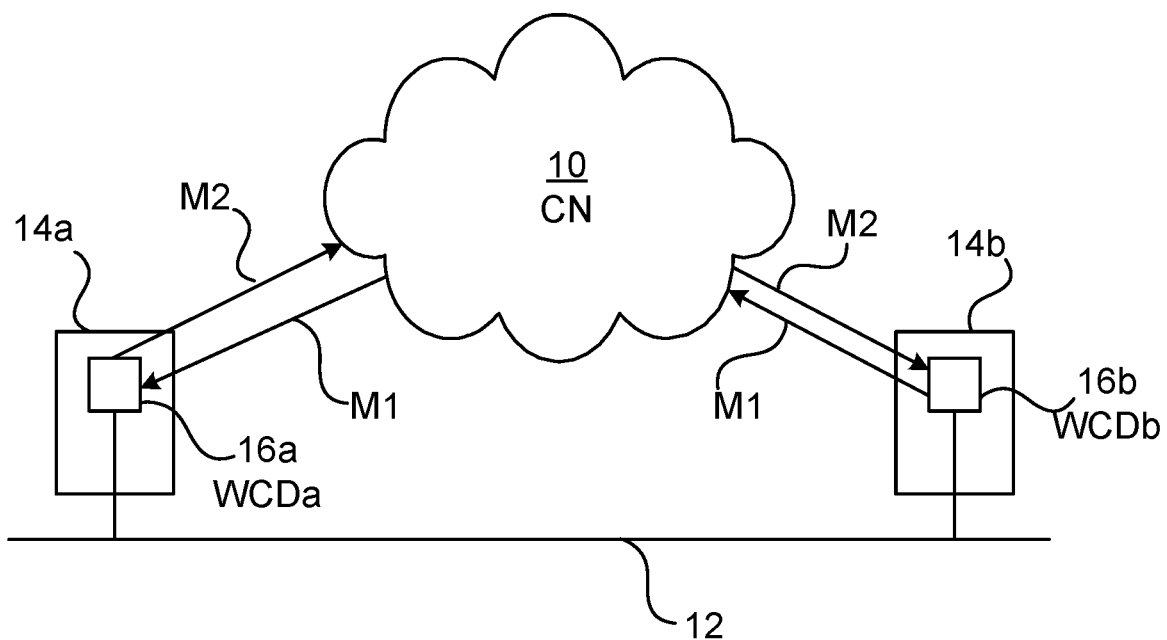
FIG. 1 schematically shows an automation system comprising a first and a second wireless communication device communicating with each other via a cellular network, FIG. 2 schematically shows the first wireless communication device comprising a first realization of a communication handling block, FIG. 3 schematically shows the first wireless communication device comprising a second realization of the communication handling block, FIG. 4 schematically shows the first wireless communication device being attached to a first base station of the cellular network and the second wireless communication device being attached to a second base station of the cellular network.

FIG. 1 is a schematic drawing illustrating an environment in which embodiments presented herein can be applied. A power transmission line 12, which may be an Alternating Current (AC) power line, is used to transfer power in an electrical power system or an electric grid, where an electrical power system is a type of industrial automation system. The transmission line 12 can transfer power in either direction. In the case of AC, the transmission line 12 may comprise separate cables for separate phases, e.g. three phases. The transmission may be a medium voltage (MV) transmission. For the purposes of the present disclosure, medium voltage (MV) relates to voltages higher than 1 kV AC and lower than 72 kV AC.

There is a first substation 14a and a second substation 14b. Each of the substations 14a, 14b obtains electric measurements of the transmission line 12. Both the first substation 14a and the second substation 14b are electrical substations for managing electrical power transfer over the power transmission line. For instance, the substations can comprise components for power conversion and/or power distribution. The electric measurements relate to voltages and/or currents and are expressed as phasors. In order to collect these phasors, each substation may comprise an Intelligent Electronic Devices (IED) that may in turn be a phasor measurement unit (PMU). In an alternative realization of the electrical power system, one of the IEDs is a PMU, while the other is a Phasor Data Concentrator (PDC) that may be communicating with several PMUs. It should also be realized that the IEDs are not limited to substations or a specific transmission line, but can be placed at any location of the electrical power system.

The PMUs communicate with each other via a cellular network CN 10. The PMU in the first substation 14a is therefore a first wireless communication device WCDa 16a while the PMU in the second substation 14b is a second wireless communication device WCDb 16b. As can be seen in FIG. 1, the communication may involve the second wireless communication device 16b sending a first message M1 to the first wireless communication device 16a via the cellular network 10 and the first wireless communication device 16a sending a second message M2 to the second wireless communication device 16b via the cellular network 10. These messages M1 and M2 will be described in more detail later.

Each of the first and the second wireless communication device 16a and 16b comprises a respective radio circuit comprising hardware and software to allow the device 16a, 16b to act as a cellular terminal, also known as User Equipment (UE), for communication with the cellular network 10. The cellular network can e.g. comply with any one or a combination of LTE (Long Term Evolution), such as 4G LTE or next generation mobile networks (fifth generation, 5G) or any other current or future wireless network, as long as the principles described hereinafter are applicable.

Figure 2:
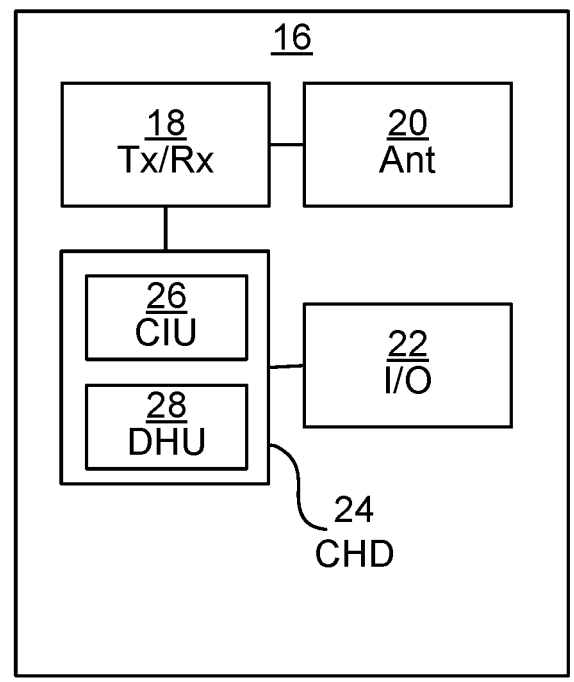

FIG. 2 is a schematic diagram illustrating components of an embodiment of a wireless communication device 16, which is applicable for both the first and the second wireless communication device 16a and 16b.

The wireless communication device 16 comprises a radio circuit 18 comprising suitable analogue and digital components to allow signal transmission Tx and signal reception Rx with the cellular network 10 using one or more antennas ANT 20.

The wireless communication device 16 also comprises a communication handling block CHD 24, which in a first variation is realized as a block comprising a connection investigating unit CIU 26 and a data handling unit DHU 28.

The functioning of the communication handling block 24 will be described in more detail shortly.

The wireless communication device 16 may further comprise an Input/Output (I/O) interface 22 for communicating with other external entities. Optionally, the I/O interface 22 also includes a user interface.

The communication handling block 24 may be realized as one or more application specific integrated circuits (ASICs), digital signal processor (DSP) or field programmable gate arrays (FPGAs).

Figure 3:
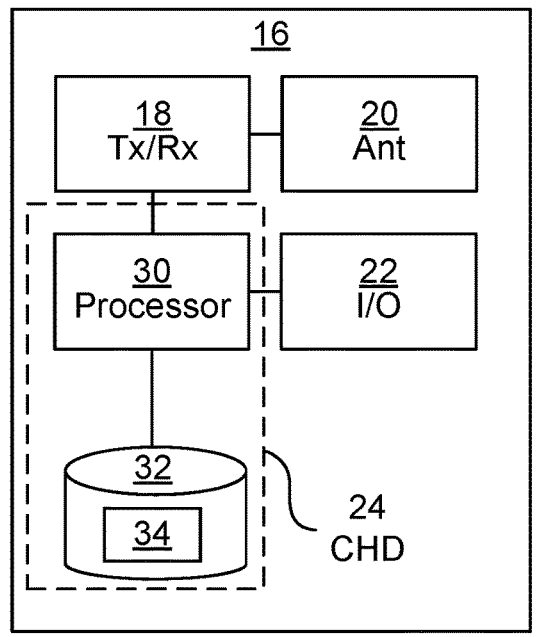

FIG. 3 shows the wireless communication device 16 according to another realization. In this case the radio circuit 18, antenna 20 and I/O interface 22 are the same as in FIG. 2. However, the communication handling block 24 has another realization. It is realized as a processor 30 acting on computer instructions 34 in a memory 32. The processor 30 may be any combination of one or more of a central processing unit (CPU), multiprocessor, microcontroller, etc., capable of executing the software instructions 34 stored in the memory 34.

The memory 32 can be any combination of random access memory (RAM) and/or read only memory (ROM). The memory 32 may also comprises persistent storage, which, for example, can be any single one or combination of magnetic memory, optical memory, solid-state memory or even remotely mounted memory. The software instructions 34 can be in the form of one of several software applications which are executable by the processor 30.

The wireless communication devices of an industrial automation system may need to communicate with each other for a number of reasons. In the example of FIG. 1 the first and second wireless communication device 16a and 16b may for instance need to communicate the phasors between the two substations 14a and 14b. This may be used for a protection function where the phasors are compared for detecting possible faults. For such fault detection, line differential analysis can be performed, as known in the art per se. This analysis can be performed in respective relays of the sub-stations 14a, 14b. It should here be realized that this is just one example of where communication between IEDs may be needed, another is for power oscillations damping.

However, in order to perform a desired function in the industrial automation system, the latency may as an example need to be low, which may especially be critical for some applications such as protection. It may therefore be necessary to ensure that the contribution to the latency made by the cellular network 10 is as low as possible.

Aspects of the invention are directed toward such an ensuring.

The cellular network 10 typically includes a number of base stations with which the wireless communication devices communicate in order to exchange data, such as phasors, between each other. In 4G and 5G networks a base station is typically denoted eNodeB or gNodeB.

Figure 4:
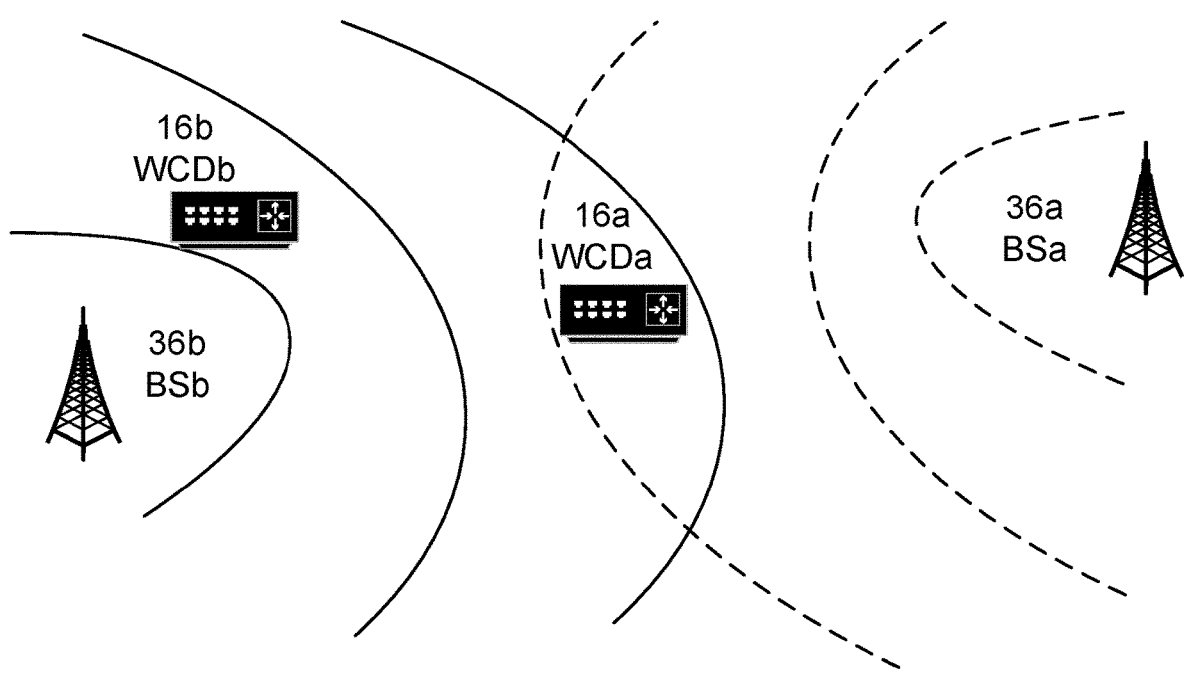

FIG. 4 shows one example of a first base station BSa 36*a* having a first coverage (indicated with dashed curves) and a second base station BSb 36*b* having a second coverage (indicated with solid curves). In this example the first wireless communication device 16*a* is attached to the first base station 36*a*, while the second wireless communication device 16*b* is attached to the second base station 36*b*. It can also be seen that the first wireless communication device 16*a* is within the coverage also of the second base station 36. It is thus within the coverage of both the first and the second base station 36*a* and 36*b*. The second wireless communication device 16*b* is on the other hand only within the coverage of the second base station 36*b*.

In the cellular network 10 the base stations communicate with each other via a core network, sometimes referred to as Evolved Packet Core (EPC). The core network may be co-located with a base station, which means that it may be located at the same physical location as one of the base stations. However, thereby it is also placed at a different location than the other base station. Thereby data that is transmitted between two wireless communication devices connected to two different base stations would need to pass through the core. This would typically influence the latency of the communication between the wireless communication devices. In particular the distance between the core and a base station that is not co-located with the core could have a considerable impact on the latency. Latency is one example of a communication parameter that may be affected. Other examples are jitter and reliability.

In many cellular networks the communication between two UEs that are attached to the same base station need not pass the core network. This means that it would be of advantage to make the wireless communication devices attach to the same base station in order to ensure that the contribution from the cellular network to the latency is as low as possible. Even if the communication between the wireless communication devices being attached to the same base station passes through co-located core, a considerable latency limitation would be achieved compared with if the communication would pass between a core and a distant base station. This may also have an effect on the jitter.

Figure 5:
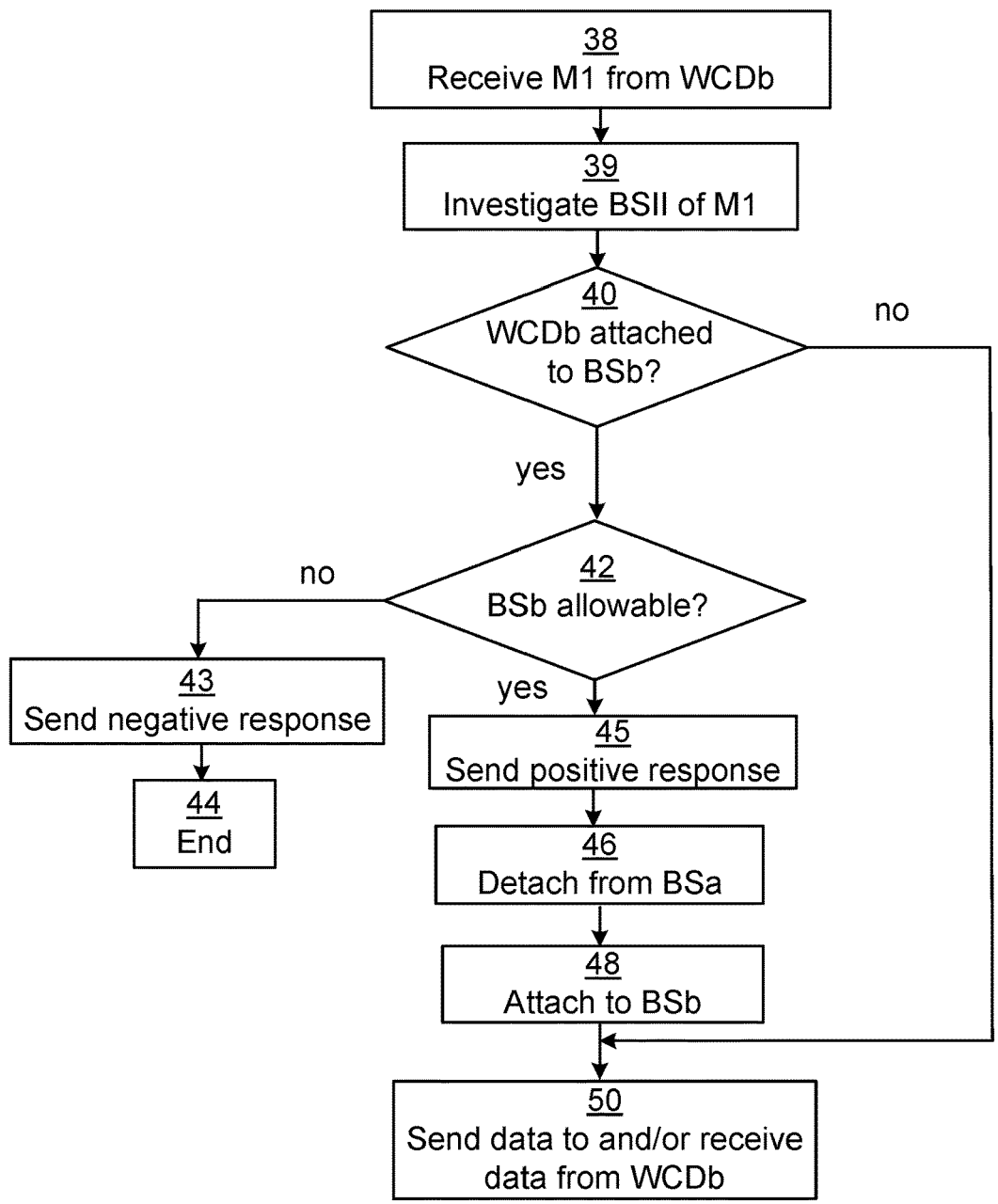
FIG. 5 shows a flow chart with a number of method steps in a first embodiment of a method of setting up communication between the first and the second wireless communication device.

How a latency and/or jitter limitation can be achieved will now be described with reference also being made to FIG. 5, which shows a flow chart of a first embodiment of a method of setting up communication between the first and the second wireless communication device 16*a* and 16*b*, where the method steps of the method are being performed in the first wireless communication device 16*a*.

It is here assumed that the first wireless communication device 16*a* is attached to the first base station 36*a* and the second wireless communication device 16*b* is attached to the second base station 36*b* and that at least one needs to send data, such as phasors, to the other.

The method begins through the connection investigating unit 26 of the first wireless communication device 16*a* receiving the first message M1 from the second wireless communication device 16*b*, step 38.

It then continues and investigates the content of this first message M1, step 39. The first message M1 may comprise base station identifying information BSII, which identifies to which base station the second wireless communication device 16*b* is attached. The investigating may therefore involve investigating the base station identifying information BSII in order to find out which base station the second wireless communication device 16*b* is attached.

The second wireless communication device 16*b* is either attached to the first base station 36*a* or another base station, where any such other base station to which the second wireless communication device 16*b* is attached is the second base station 36*b*. Therefore, if it is not attached to the second base station 36*b*, step 40, the second wireless communication device 16*b* has to be attached to the first base station 36*a*. In this case the latency and/or jitter caused by the cellular network 10 is already as low as possible. Thereby the data handling unit 28 can go on and order the radio circuit 18 to start to send data to and/or receive data from the second wireless communication device 16*b*, step 50.

However, if the second wireless communication device 16*b* is attached to the second base station 36*b*, step 40, then the connection investigating unit 26 continues and investigates if one or more conditions for attaching to the second base station 36*b* are fulfilled by the first wireless communication device 16*a*, where one condition is that the second base station 36*b* is allowable. In this embodiment the condition that the second base station 36*b* is an allowable or approved base station is the only condition being investigated.

The second base station 36*b* may be allowed, i.e. the first wireless communication device 16*a* may be allowed to communicate with the second base station 36*b*, if the first wireless communication device 16*a* has the second base station 36*b* in a list of available base stations to which handover can be made. This list is a cellular network list, e.g. a list associated with the cellular network 10 and set up according to communication rules of the cellular network 10. The second base station 36*b* may be allowable if the first wireless communication device 16*a* is able to receive signals and extract base station identifying information from such signals, such as pilot signals being broadcast by the second base station 36*b*. The investigation may also involve an investigation of if the second base station 36*b* is actually a part of the same cellular communication network as the first base station 36*a*. The investigation may also comprise an investigation of if the second base station is on a list of allowable base stations approved for communication in the industrial automation system, e.g. a so-called white list associated with the automation system. This list may more particularly be a list that is specific for the first wireless communication device 16*a*. It should here also be mentioned that it is possible that a user entered information about the second base station 36*b* may be compared with this white list.

If the second base station 36*b* is not allowable, step 42, then the connection investigating unit 26 instructs the radio circuit 18 to send a negative response to the first message M1 to the second wireless communication device 16*b*, step 43, and then ends the method, step 44, whereupon the first wireless communication device 16*a* continues to be attached to the first base station 36*a*.

A negative response to the first message M1 is a response indicating an inability of the first wireless communication device 16*a* to attach to the second base station 36*b*.

However, if the second base station 36*b* is an allowable base station, step 42, then the connection investigating unit 26 instructs the radio circuit 18 to send a positive response to the first message M1 to the second wireless communication device 16*b*, step 45, to detach from the first base station 36*a*, step 46, and to attach to the second base station 36*b*, step 48, where the attaching and the detaching may be carried out through the performing of a handover procedure from the first to the second base station, which handover may additionally be a so-called soft handover.

A positive response to the first message M1 is a response indicating an ability of the first wireless communication device 16a to attach to the second base station 36b.

After the first wireless communication device 16a has attached to the second base station 36b, the data handling unit 28 may order the radio circuit 18 to start to send data to and/or receive data from a corresponding data handling unit of the second wireless communication device 16b, step 50, which data may as an example be phasor data.

Through both the first and second wireless communication device 16a and 16b using the second base station 36b the use of the core network may be avoided and thereby the contribution to the latency from the cellular network 10 can be kept at a minimum. If the wireless communication devices are involved in control in the automation system then the used control loops may be simplified, which may result in less jitter. Also the reliability of the automation system may increase, since fewer devices and components are involved. Furthermore, an application may be allowed to be connected to a single base station, which may also simplify commissioning/provisioning. The moving of the first wireless communication device 16a to the second base station 36b may also be performed prematurely if the first base station 36a is going down (due to e.g. maintenance, software update).

Through the reception of the first message, the first wireless communication device knows if the second wireless communication device is connected to the same base station or not. Moreover, through the investigation of the one or more conditions, the first wireless communication device also knows if it can attach to the second base station or not. Through the sending of a response, either a positive or a negative response, also the second wireless communication device knows whether the first wireless communication device can attach to the second base station or not. Thereby the wireless communication devices can adapt their communication based on the knowledge of whether they are connected to the same cell different base stations. This means that a control loop involving both the first and the second wireless communication devices can adapt to changes in jitter and/or delay caused by the wireless communication devices being attached to the same or different base stations.

It should here be realised that only one type of response may be sent, which may with advantage be a negative response. It is thus possible that the first wireless communication device sends a negative response in case it is unable to attach to the second base station but sends no response or is silent in case it is able to attach to the second base station. The positive response may thus be omitted or vice versa.

Figure 6:
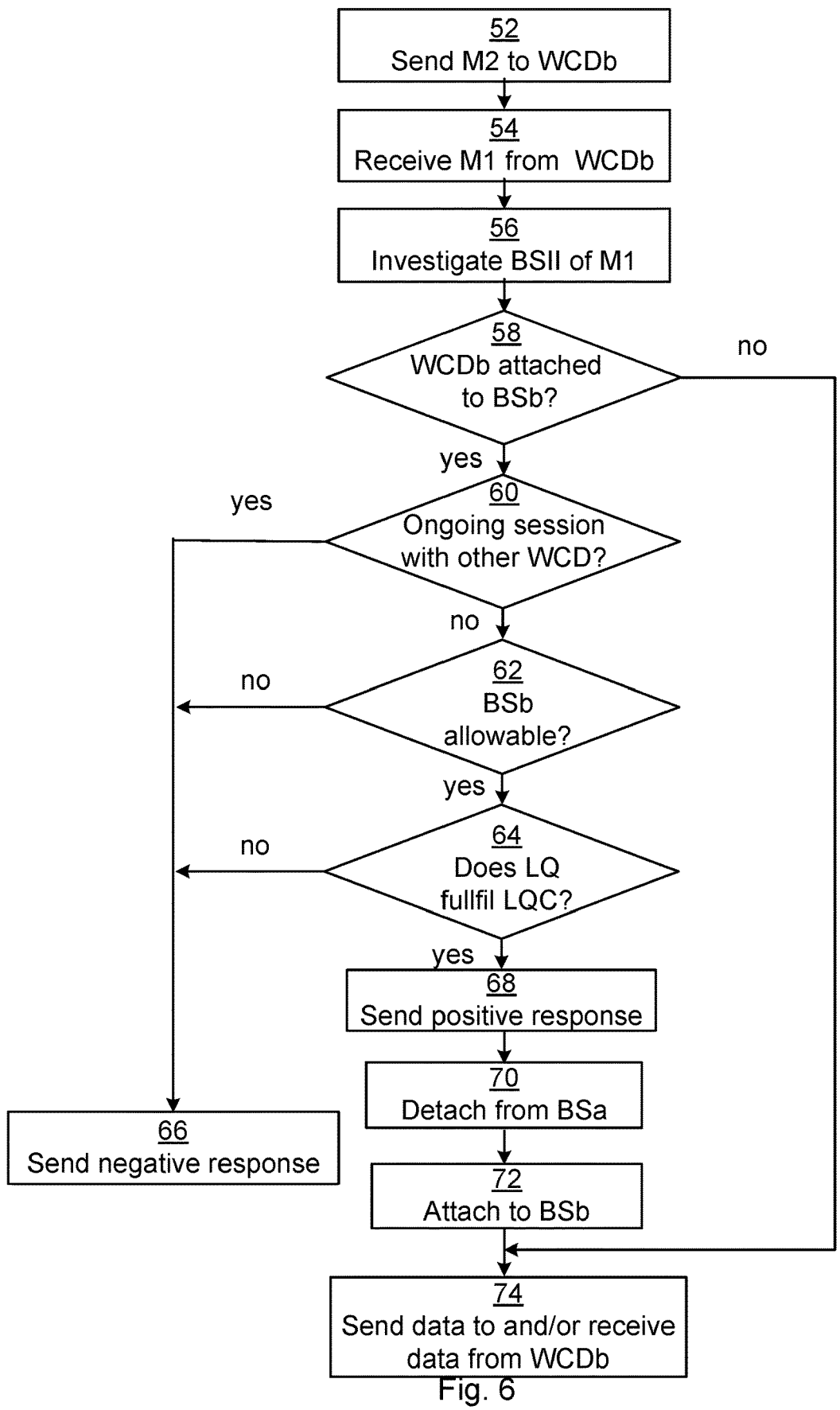
FIG. 6 shows a flow chart with a number of method steps in a second embodiment of the method of setting up communication between the first and the second wireless communication device, and FIG. 7 schematically shows a computer program product according to an embodiment of the invention in the form of a CD ROM disc on which a computer program for implementing the communication handling block is provided.

A second embodiment that addresses latency and/or jitter limitation will now be described with reference being made to FIG. 6, which shows a flow chart of the method of setting up communication between the first and the second wireless communication device 16a and 16b according to the second embodiment, where the method steps of the method are being performed in the first wireless communication device 16a. Also here the situation shown in FIG. 4 applies.

The connection investigating unit 26 of the first wireless communication device 16a in this case instructs or orders the radio circuit 18 to send the second message M2 to the second wireless communication device, step 52, which radio circuit 18 then sends the second message M2 via the antenna 20 and the first and second base stations 36a and 36b to the second wireless communication device 16b.

The connection investigating unit 26 also receives the first message M1 via the radio circuit 18, antenna 20 and the first and second base stations 36a and 36b, step 54.

It should be noted here that the first and second messages are no sync messages of the cellular network 10, such as used between a UE and a base station. The first and second messages are messages that are sent between the first and second wireless communication devices 16a and 16b over a link that is set up between the two devices through the cellular network 10.

The messages comprise Base Station Identifying Information BSII, which is information about the base station to which the wireless communication device in question is attached. It is thus information about the base station to which the sending wireless communication device is attached. This information may comprise information such as Cell ID, Network ID and Tracking Area ID and may as an example be obtained through a wireless communication device listening to a pilot signal being broadcast by the base station. Cell ID is here the identity of a cell provided by a base station, Network ID is the identity of the cellular network and Tracking Area ID is the identity of a group of cells comprising the cell with the Cell ID.

The connection investigating unit 26 of the first wireless communication device 16a then investigates this base station identifying information BSII of the first message M1, step 56, where the investigation may be an investigation of to which base station the second wireless communication device is attached.

Also in this case, the second wireless communication device 16b is either attached to the first base station 36a or another base station, where any such other base station to which the second wireless communication device 16b is attached is the second base station 36b. Therefore, if it is not attached to the second base station 36b, step 58, the second wireless communication device 16b has to be attached to the first base station 36a. In this case the latency caused by the cellular network 10 is already as low as possible. Thereby the data handling unit 28 can go on and order the radio circuit 18 to start to send data to and/or receive data from the second wireless communication device, step 74.

However, if the second wireless communication device 16b is attached to the second base station 36b, step 58, then the connection investigating unit 26 continues and investigates if various conditions for attaching to the second base station 36b are fulfilled by the first wireless communication device 16a.

One condition may be that the first wireless communication device 16a is not involved in communication sessions with any other wireless communication devices.

The connection investigating unit 26 may therefore investigate if there is an ongoing communication session with another communication device, such as if the first wireless communication device 16a is exchanging phasors with another wireless communication device than the second wireless communication device 16b.

If the first wireless communication device 16a is involved in such a session, step 60, the connection investigating unit 26 goes on and orders the radio circuit 18 to send a negative response to the first message M1, which may be done through sending a negative acknowledgement NACK of the first message M1 to the second wireless communication device 16b via the radio circuit 18 and antenna 20, step 66.

Another condition may be that the second base station is available to the first wireless communication device.

Therefore, if no session is ongoing, step 60, the connection investigating unit 26 may investigate if the second base station 36b is allowable for the first wireless communication device 16a, such as if the first wireless communication device 16a has the second base station 36b in a list of available base stations to which handover can be made. The second base station 36b may be allowable if the first wireless communication device 16a is able to receive signals and extract base station identifying information from such signals, such as pilot signals being broadcast by the second base station 36b. Another possible investigation is an investigation of if the second base station 36b belongs to the same cellular network as the first base station 16a. Yet another possible investigation is that the second base station 36b is on the previously mentioned white list associated with the first wireless communication device 16a, where the second base station 36b is allowable if it belongs to the same network and/or is on the white list.

If the second base station 36b is not allowable, step 62, then the connection investigating unit 26 goes on and orders the radio circuit 18 to send a negative response to the first message M1 to the second wireless communication device 16b, step 66.

Yet another condition may be that the link quality LQ between the first wireless communication device 16a and the second base station 36b fulfils a link quality criterion LQC.

Therefore, if the second base station 36b is allowable, step 62, the connection investigating unit 26 may go on and investigate if the quality of a communication link between the first wireless communication device 16a and the second base station 36b fulfils a link quality criterion LQC. The criterion may be provided in the form of one or more thresholds. The link quality LQ may for instance comprise the signal strength and/or bit error rate of the base station transmissions that may be compared with a corresponding threshold. The link quality criterion LQC may be fulfilled if the measured link quality LQ is on the right side of the corresponding threshold. The link quality criterion LQC for signal strength may be fulfilled when the signal strength is above the corresponding threshold, while it may be fulfilled for a bit error rate below the corresponding threshold. It should be realized that other link quality criteria can be used such as Carrier-to-interference ratio (CIR) and Block Error Rate (BLER). It is also possible to base the decision on the number of retransmissions.

If the link quality criterion is not fulfilled, step 64, the connection investigating unit 26 goes on and orders the radio circuit 18 to send a negative response to the first message M1 to the second wireless communication device, step 66.

However, if the link quality criterion LCQ is fulfilled, step 64, then the connection investigating unit 26 orders the radio circuit 18 to send a positive response to the first message M1 a to the second wireless communication device 16 via the radio circuit 18 and antenna 20, step 68. The positive response may be sent as an acknowledgement or ACK of the first message M1. The connection investigating unit 26 then instructs the radio circuit 18 to detach from the first base station 36a, step 70, and to attach to the second base station 36b, step 72, where the attaching and the detaching may be carried out through the performing of a handover procedure from the first to the second base station, which handover may additionally be a so-called soft handover.

It is also in this case possible that the only response to the first message M1 is a negative response or a positive response.

After the first wireless communication device 16a has attached to the second base station 36b, the data handling unit 28 may order the radio circuit 18 to start to send data to and/or receive data from a corresponding data handling unit of the second wireless communication device 16b, step 74, which data may as an example be phasor data.

Through both the first and second wireless communication device 16a and 16b using the second base station 36b the use of the core network may be avoided and thereby the contribution to the latency from the cellular network 10 can be kept at a minimum.

Through the use of the first message and the response to the first message it is possible for both wireless communication devices to know if they are connected to same or different base stations. Both may therefore be able to adapt to their communication to this knowledge. Through the sending of the second message, both the first and second wireless communication device knows the base station that the other is attached to, which allows further adaptation to be made. Through the response to the second message it is additionally possible for both wireless communication devices to know if the other is able to attach to the same base station that it is attached to itself. This allows one wireless communication device to attach to the base station of the other, in case the other wireless communication device is unable to detach form its current base station.

It can be seen in the IED example above, that the latency in the communication between IEDs is limited through reducing the number of hops between base stations in the case where a cellular communication network is used. This will also have a positive effect on possible jitter.

It should here be realized that the second wireless communication device 16b may have the same type of operation as the first wireless communication device 16a. If it has the same type of operation, it can in the example according to FIG. 4 be seen that it will send a negative response to the second message M2 of the first wireless communication device 16a because the first base station 36a is not available.

The described operation can be a complement to differentiated scheduling and edge computing mechanisms and will remove the time from the data packets to leave one base station and go to the EPC, from where it is routed to the second base station. Instead both the wireless communication devices will try to fall under the same base station and can make use of the local break out/core network for routing of the packets.

In Differentiated scheduling user traffic is tagged and can have priority during the access of the radio resources. This reduces the latency when there is traffic in the network from multiple sources. However, some latency will be added as the traffic is routed over multiple base stations. Similarly, techniques such as in Edge computing, the device is served by a core network (edge computing node) or a processing unit, kept very close to the radio network, e.g. routing the user packets in the user plane.

Put differently it can be seen that the wireless communication devices, which may be IEDs such as PMUs and/or phasor data concentrators (PDCs), have the capability to
1. Send and receive message with base station identifying information to and from corresponding wireless communication devices such as PDC before start sending phasors information or any other information that needs to be communicated between the wireless communication devices
a. The message contains information such as Network ID, Tracking Area ID, Cell ID of base station to which the wireless communication devices is attached
b. After receiving a first message the first wireless communication device checks whether it is communicating with other wireless communication devices at that moment
c. If yes then the first wireless communication device sends a negative response to the second wireless communication device indicating its inability to change its base station in order to prevent disruption in the existing communication.

2. Determine the availability of the corresponding base station based on the cellular network broadcast and the NetworkID of the corresponding wireless communication device's base station 3. If the corresponding wireless communication device's base station is not found send a negative response to the corresponding wireless communication device, 4. If the corresponding base station is found then determine whether the link quality fulfils the link quality criterion 5. If the link quality fulfils the link quality criterion then attach with the corresponding node's base station and send a positive response to the corresponding wireless communication device, 6. If the link quality does not fulfil the link quality criterion then send a negative response to the corresponding wireless communication device, 7. Begin exchange of information In the example given above the communication was exemplified by the communication between two IEDs realized as PMUs in an electrical power system. However, it should be realized that it is possible with other types of IEDs. It is for instance possible that the first wireless communication device is a PMU and the second wireless communication device is a PDC, for instance realized in an edge node, where the edge node also communicates with other PMUs. In this case it is possible that the PMU acting as a first wireless communication device does not send a sync message. It is additionally possible that the PDC acting as a second wireless communication device does not send any data to the PMU.

It should also be realized that the communication can just as well be provided in other types of industrial automation systems. It is for instance possible to use in a process control system, where two wireless field devices are to communicate with each other or where a wireless field device is to communicate with a programmable logic controller (PLC) via a gateway.

Figure 7:
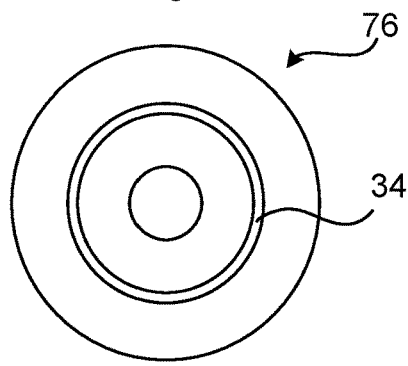

The communication handling module was above described as being provided in the form of a processor with associated program memory including computer program code for performing the functionality of the connection investigating unit and the data handling unit. The computer program code may also be provided on a data carrier, like a CD ROM disc or a memory stick, which will implement the function of the communication handling module when being loaded into a computer. One such computer program product in the form of a CD ROM disc 76 with the computer program code 34 is schematically shown in FIG. 7.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method of setting up communication between a first and a second wireless communication device of an industrial automation system via a cellular network, the method being performed in the first wireless communication device and comprising the steps of:
   receiving, while the first wireless communication device is attached to a first base station of the cellular network, a first message from the second wireless communication device via the first base station, said first message including information identifying a particular base station of the cellular network to which the second wireless communication device is attached,
   investigating the information of the first message in order to identify said particular base station to which the second wireless communication device is attached,
   if said particular base station to which the second wireless communication device is attached is a second base station different from the first base station, then further performing the steps of:
      investigating if one or more conditions for attaching to the second base station are fulfilled by the first wireless communication device, wherein one condition is that the second base station is allowable, and
      sending a response to the first message concerning the ability of the first wireless communication device to attach to the second base station,
   wherein if said one or more conditions are fulfilled, the method further includes,
      detaching from the first base station, and
      attaching to the second base station.

2. The method according to claim 1, wherein the fulfilment of one condition involves investigating if there is an ongoing communication session with another wireless communication device of the industrial automation system via the first base station and only performing the detaching and attaching in case there is not.

3. The method according to claim 1, wherein the fulfilment of one condition involves investigating the allowability of the second base station and only performing the detaching and attaching in case the second base station is allowable.

4. The method according to claim 3, wherein the investigating of the allowability includes investigating if the second base station is on a list of approved base stations.

5. The method according to claim 1, wherein the fulfilment of one condition involves investigating the quality of the wireless link between the first wireless communication device and the second base station and only performing the detaching and attaching in case the link quality fulfils a link quality criterion.

6. The method according to claim 1, wherein the response comprises a negative response to the first message if said one or more conditions are not fulfilled.

7. The method according to claim 1, wherein the response comprises a positive response to the first message if said one or more conditions are fulfilled.

8. The method according to claim 1, further comprising sending a second message to the second wireless communication device including information that identifies the first base station and receiving a response to the second message from the second wireless communication device concerning the ability of the second wireless communication device to attach to the first base station.

9. The method according to claim 1, further comprising starting sending data to and/or receiving data from the second wireless communication device via the second base station after the attaching to the second base station.

10. A first wireless communication device in an industrial automation system and comprising,
    a radio circuit for wireless communication with other wireless communication devices of the industrial automation system via a cellular network, and
    a communication handling processor configured to;
    receive, while the first wireless communication device is attached to a first base station of the cellular network, a first message from a second wireless communication device via the first base station, said first message including information identifying a particular base station of the cellular network to which the second wireless communication device is attached,
investigate the information of the first message in order to identify said particular base station to which the second wireless communication device is attached,
if the particular base station to which the second wireless communication device is attached a second base station different from the first base station, the communication handling processor being further configured to;
  investigate if one or more conditions for attaching to the second base station are fulfilled by the first wireless communication device, wherein one condition is that the second base station is allowable, and
  instruct the radio circuit to send a response to the first message concerning the ability of the first wireless communication device to attach to the second base station,
wherein if said one or more conditions are fulfilled, the communication handling processor is further configured to;
  instruct the radio circuit to detach from the first base station, and
  instruct the radio circuit to attach to the second base station.

11. The first wireless communication device according to claim 10, wherein the investigating of one or more conditions involves investigating if there is an ongoing communication session with another wireless communication device of the industrial automation system via the first base station and only performing the detaching and attaching in case there is not.

12. The first wireless communication device according to claim 10, the communication handling processor being further configured to instruct the radio circuit to send a second message to the second wireless communication device comprising information that identifies the first base station and receive a response to the second message from the second wireless communication device concerning the ability of the second wireless communication device to attach to the first base station.

13. The first wireless communication device according to claim 10, wherein it is an intelligent electronic device and the industrial automation system is an electrical power system.

14. A computer program product for setting up communication between a first wireless communication device and a second wireless communication device of an industrial automation system via a cellular network, the computer program product comprising;
a non-transitory computer readable medium and computer program code stored on said computer readable medium, wherein the computer program code, when run by a processor of a communication handling module of the first wireless communication device, causes the communication handling module to:
receive, while the first wireless communication device is attached to a first base station of the cellular network, a first message from the second wireless communication device via the first base station, said first message including information identifying a particular base station of the cellular network to which the second wireless communication device is attached,
investigate the information of the first message in order to identify said particular base station to which the second wireless communication device is attached,
if said particular base station to which the second wireless communication device is attached to is a second base station different from the first base station, further causes the communication handling module to:
  investigate if one or more conditions for attaching to the second base station are fulfilled by the first wireless communication device, where one condition is that the second base station is allowable, and
  send a response to the first message concerning the ability of the first wireless communication device to attach to the second base station,
wherein if said one or more conditions are fulfilled, the communication handling module is further caused to:
  instruct a radio circuit of the first wireless communication device to detach, from the first base station and
  instruct the radio circuit to attach to the second base station the second wireless communication device.

15. The method according to claim 2, wherein the fulfilment of one condition involves investigating the quality of the wireless link between the first wireless communication device and the second base station and only performing the detaching and attaching in case the link quality fulfils a link quality criterion.

16. The method according to claim 2, wherein the response comprises a negative response to the first message if said one or more conditions are not fulfilled.

17. The method according to claim 2, wherein the response comprises a positive response to the first message if said one or more conditions are fulfilled.

18. The method according to claim 2, further comprising sending a second message to the second wireless communication device including information that identifies the first base station and receiving a response to the second message from the second wireless communication device concerning the ability of the second wireless communication device to attach to the first base station.

* * * * *